June 29, 1948.  P. H. CRAIG  2,444,222

OXYGEN ENRICHMENT SYSTEM FOR GAS ENGINES

Filed Aug. 18, 1943

Inventor
PALMER H. CRAIG

By Ralph B. Stewart
Attorney

Patented June 29, 1948

2,444,222

UNITED STATES PATENT OFFICE 2,444,222

OXYGEN ENRICHMENT SYSTEM FOR GAS ENGINES

Palmer H. Craig, Gainesville, Fla., assignor, by mesne assignments, to Invex Inc., a corporation of Florida Application August 18, 1943, Serial No. 499,154

4 Claims. (Cl. 123—119)

This invention relates to a system for enriching the oxygen content of the air supplied to the carburetor of an internal combustion engine.

The primary object of my invention is to increase the oxygen content of the air supplied to the carburetor of a gas engine and to thereby increase the operating efficiency.

A further object of the invention is to utilize the heat from the exhaust gases of the engine to assist in the separation of oxygen from the other gas components of the air.

In carrying out the objects of my invention, I have devised a gas filter which will pass oxygen more readily than nitrogen and other gas components of air. As the selective transmission elements I employ thin films of metal, preferably silver, which are somewhat porous to gases and which will allow oxygen to pass through them with greater ease than nitrogen.

The efficiency of the filter is greatly increased if the films are maintained at a relatively high temperature, and the heat from the exhaust gases of the engine is used for this purpose.

My invention is illustrated in the accompanying drawing in which.

Figure 1:
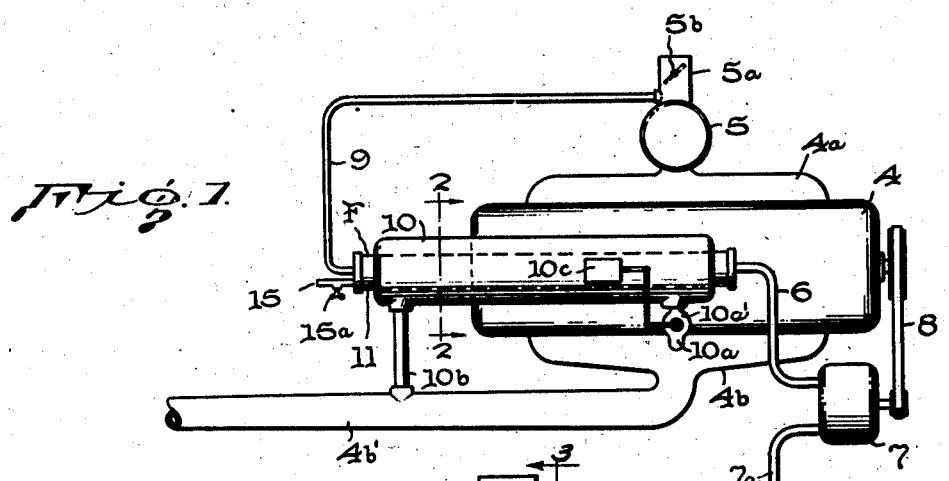
Figure 1 is a diagrammatic plan view showing the oxygen filtering apparatus applied to a gas engine.

Referring to the drawing, 4 indicates the cylinder block of a gas engine in plan view and having an intake manifold 4a on one side thereof and an exhaust manifold 4b on the other side. A suitable carburetor 5 having an air inlet 5a controlled by a suitable valve 5b supplies a fuel and air mixture to the intake manifold 4a. The exhaust gases from the outlet manifold 4b pass out to the usual muffler (not shown) through the exhaust pipe 4b'. All of the elements described so far are conventional parts of the usual gas engine.

The filter structure for supplying at least a portion of the air to carburetor 5 consists of a filter unit generally indicated in Figure 1 at F. This unit may be mounted in any convenient location, but for the purpose of illustration I have shown it mounted above the engine in Figure 1. The details of construction of the filter unit will be described below. It consists generally of a cylindrical structure having an inlet pipe 6 which is supplied with air under pressure from a suitable air pump 7 driven from the engine through any suitable means such as the belt 8. Pump 7 has an air inlet 7a. The outlet end of the filter F is connected through a suitable pipe 9 to the inlet 5a of the carburetor at point between the carburetor and the valve 5b. The filter F is surrounded by a cylindrical casing 10 which is closed at both ends to provide a heating jacket for the filter, and some of the exhaust gases are passed through this jacket. For this purpose, the gases are introduced in the front end of jacket 10 from manifold 4b through a connection 10a and is taken out of the rear end of the jacket and returned to the exhaust pipe 4b' through connection 10b. A suitable controlling valve 10a' is included in the connection 10, and this valve may be controlled by any suitable thermostatic device 10c which responds to the temperature of the filter to regulate the amount of exhaust gases flowing through the jacket 10 and to thereby maintain the filter at a substantially constant temperature.

Figure 2:
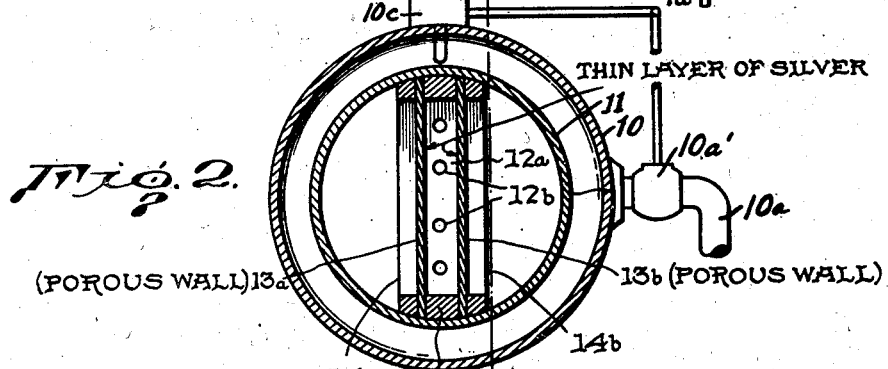
Figure 2 is a sectional view of the filtering apparatus shown in Figure 1 taken along the line 2—2.
Figure 3:
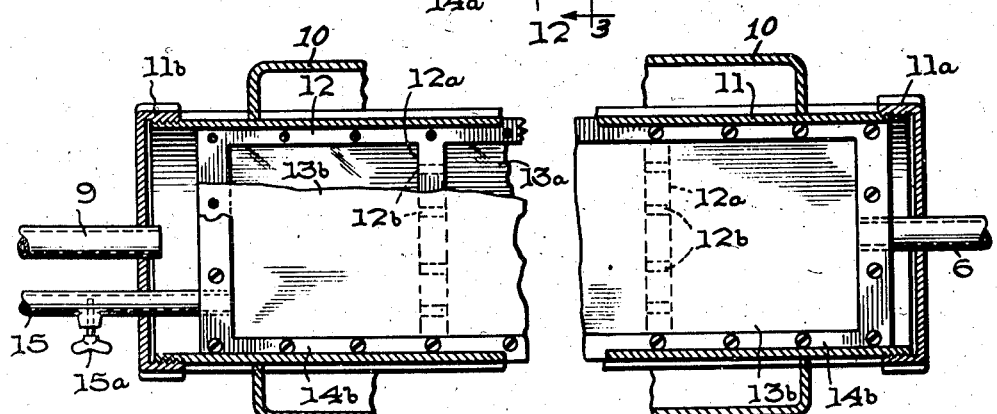
Figure 3 is a sectional view of the filtering apparatus taken along the line 3—3 in Figure 2 and showing certain elements cut away.

The filter construction is illustrated in detail and on an enlarged scale in Figures 2 and 3. It consists of a cylindrical casing 11 closed at both ends by caps 11a and 11b. Mounted within the cylinder 11 is a rectangular frame 12 having a number of cross members 12a each provided with a number of passages shown as holes 12b for connecting adjacent spaces within the frame. A pair of porous walls or diaphragms 13a and 13b are arranged on the two sides of frame 12. These walls are securely clamped to the frame by clamping members 14a and 14b which are substantially co-extensive with the frame 12 and are secured to the frame 12 by any suitable means. Each of the walls 13a and 13b is provided with a thin metallic coating or layer on one of its faces, preferably the inner face.

The porous walls may be formed of any suitable material which will give good mechanical support for the metallic diaphragm or layer and at the same time will allow gases to pass through the walls. The porous walls may be formed of unglazed porcelain, fritted glass made from "hard" glass such as "Pyrex," finely woven wire mesh or perforated metallic plate. The metal plate may be perforated by a large number of extremely small holes by photographing a design of this kind thereon and etching the plate with acid to eat away the small holes. Any other suitable method of forming the perforations may be employed. Any porous material may be used which will supply the necessary mechanical strength and will withstand the temperature to which the filter is subjected.

The metallic film or layer constituting the selective filter diaphragm may be applied to the porous backing plate in a number of different ways. For example, a thin film of metal may be deposited directly on the plate by cathodic sputtering, or by the Rochelle salt process, or by the Brashear's process, all of which are well known. The thin metallic diaphragms may be formed separately and then secured to the porous walls by suitable cement.

I prefer to use silver for the metallic coating, but any other metal which will selectively transmit oxygen at a greater rate than nitrogen may be used. The thickness of the metallic film or layer is not critical, but I prefer to use thicknesses varying from 0.01 mm. to 0.2 mm.

As shown in Figure 3, the inlet pipe 6 for the filter passes through cap 11a of cylinder 11 and through the front end of the frame 12, thus communicating with the inner space of the filter bounded by the frame 12 and by filter plates 13a and 13b. The inner end of pipe 6 is securely sealed in the frame 12 to provide a gas-tight connection. The outlet pipe 9 passes through the cap 11b and communicates with the space within cylinder 11 surrounding the filter plates 13a and 13b. A pipe 15 also passes through cap 11b and through the rear end of frame 12 and communicates with the space between plates 13a and 13b. This pipe is provided with an adjustable bleeder valve 15a for the purpose to be described hereinafter.

Pump 7 may be of any suitable type capable of developing from two to five atmospheres of pressure.

Operation of the system is as follows:

It will be assumed that the engine is operating and that a portion of the exhaust gases are passing through the heater jacket 10 surrounding the filter. The thermostatic element 10c is set to maintain the temperature of the filter at approximately 700 to 800° C. Pump 7 supplies ordinary air to the filter through pipe 6 at a pressure which may vary from 1 to 5 or more atmospheres. Under these temperature and pressure conditions the various components of the air in the filter will be transmitted through the thin metallic films but at different rates. Oxygen passes through more readily, and the air supplied to the carburetor through pipe 9 will be rich in oxygen whereas the air remaining in the filter will be correspondingly enriched in nitrogen. The function of bleeder valve 15 is to permit the nitrogen-rich-air within the inner filter space to be drained away and to be replaced by fresh incoming air. This valve should be set to allow the inner air to escape at a rate which will not reduce the pressure within the filter space below that necessary for proper operation.

The rate of diffusion of the oxygen through the thin metallic film may be expressed by the following equation:

$$D = \frac{1.71}{10^{43}} \times \sqrt{\frac{P}{d}} \times T^{14.62}$$

where

D is the rate of diffusion in cc. per sq. meter per hour
P is the pressure of the oxygen in millimeters
d is the thickness of the silver in millimeters
T is the absolute temperature From this equation it will be seen that the rate of diffusion is proportional to the square root of pressure of the gas and varies inversely as the thickness of the metallic film. Also, the rate of diffusion increases at a very high rate with increase in temperature, hence it is desirable to maintain the filter at the highest temperature which can be maintained without destroying the filter.

The pump 7 may not always be necessary since the vacuum produced by the engine will cause a certain separation of oxygen, but the amount of separation will be increased by use of the pump.

From the foregoing it will be seen that the selective filter which permits the passage of oxygen more readily than the passage of nitrogen is interposed in the air intake of at least a portion of the air supply to the carburetor 5. This arrangement increases the percentage of oxygen in the air supplied to the carburetor and thereby increases the efficiency of the engine. The exhaust gases of the engine are used to maintain the filter at a predetermined temperature and secure maximum efficiency from the filter. It is obvious that an additional source of heat may be employed if required, or the filter may be entirely heated from a separate source. For example, the heat may be generated within the filter films by passing an electric current through the films, and in this case it would be convenient to form the mounting and clamping frames of insulating material. Where the porous backing plates also are metallic, the necessary heat may be generated by current flow through these plates.

While I have shown a preferred construction of the filter employed in my invention, it will be obvious that various other constructions may be used to accomplish the same purpose.

The term "gas engine" as employed herein is to be interpreted broadly to apply to internal combustion engines generally, including oil fueled engines.

I claim:

1. In combination, a gas engine having a carburetor provided with an air intake, filter means interposed in said air intake and comprising a thin metallic diaphragm formed of silver, and including means for maintaining said diaphragm at a temperature of the order of 800° C.

2. In combination, a gas engine having a carburetor provided with an air intake, a selective gas filter interposed in said intake and comprising a thin diaphragm of silver having a thickness of the order of 0.01 to 0.2 millimeter, means for maintaining said diaphragm at a temperature of the order of 800° C., and means for forcing air through said filter at a pressure of the order of two to five atmospheres.

3. A combination according to claim 2 wherein said means for heating said diaphragm comprises a jacket surrounding said filter and means for passing exhaust gases from said engine through said jacket to heat said filter.

4. In combination, a gas engine having a carburetor provided with an air intake, filter means interposed in said air intake and comprising a thin metallic diaphragm formed of silver, and including means for transferring heat from the exhaust gases of said engine to maintain said diaphragm at a temperature of the order of 800° C.

PALMER H. CRAIG.

REFERENCES CITED

The following references are of record in the file of this patent:

UNITED STATES PATENTS

| Number | Name | Date |
|--------|------|------|
| 820,283 | Clamond | May 8, 1906 |
| 1,174,631 | Snelling | Mar. 7, 1916 |
| 1,232,215 | Cabanne | July 3, 1917 |
| 1,553,737 | Allingham | Sept. 15, 1925 |
| 1,871,226 | Skala | Aug. 9, 1932 |
| 2,147,671 | Pratt | Feb. 21, 1939 |
| 2,178,454 | Metzger | Oct. 31, 1939 |

OTHER REFERENCES

Thorpe's Dictionary of Applied Chemistry, Fourth Edition, No. III (1939), page 605 (copy in Div. 59).